United States Patent
Szczepanik et al.

(10) Patent No.: US 11,726,692 B2
(45) Date of Patent: Aug. 15, 2023

(54) ENHANCED APPLICATION PERFORMANCE USING STORAGE SYSTEM OPTIMIZATION

(71) Applicant: INTERNATIONAL BUSINESS MACHINES CORPORATION, Armonk, NY (US)

(72) Inventors: Grzegorz Piotr Szczepanik, Cracow (PL); Kushal S. Patel, Pune (IN); Sarvesh S. Patel, Pune (IN); Lukasz Jakub Palus, Cracow (PL)

(73) Assignee: International Business Machines Corporation, Armonk, NY (US)

(*) Notice: Subject to any disclaimer, the term of this patent is extended or adjusted under 35 U.S.C. 154(b) by 85 days.

(21) Appl. No.: 17/109,180

(22) Filed: Dec. 2, 2020

(65) Prior Publication Data
US 2022/0171560 A1 Jun. 2, 2022

(51) Int. Cl.
*G06F 12/00* (2006.01)
*G06F 13/00* (2006.01)
(Continued)

(52) U.S. Cl.
CPC .......... *G06F 3/0647* (2013.01); *G06F 3/064* (2013.01); *G06F 3/067* (2013.01); *G06F 3/0611* (2013.01);
(Continued)

(58) Field of Classification Search
CPC .... G06F 3/0647; G06F 3/0611; G06F 3/0614; G06F 3/0635; G06F 3/064; G06F 3/0659;
(Continued)

(56) References Cited

U.S. PATENT DOCUMENTS 6,237,021 B1 5/2001 Drummond
8,924,675 B1 12/2014 Burke
(Continued)

FOREIGN PATENT DOCUMENTS

| CN | 103605483 A | 2/2014 |
|----|----|----|
| CN | 107844269 A | 3/2018 |
| CN | 111506262 A | 8/2020 |

OTHER PUBLICATIONS

Cai et al., "Read Disturb Errors in MLC NAND Flash Memory: Characterization, Mitigation, and Recovery", Conference: 2015 45th Annual IEEE/IFIP International Conference on Dependable Systems and Networks (DSN), Conference Paper ? Jun. 2015, 13 pages.
(Continued)

*Primary Examiner* — Sheng Jen Tsai
(74) *Attorney, Agent, or Firm* — Daniel J. Hakimi (57) ABSTRACT

A method, a computer system, and a computer program product for tiering migration for storage system optimization is provided. Embodiments of the present invention may include determining to move data based on access counters to balance a workload between storage drives and storage tiers. Embodiments of the present invention may include establishing a connection with an interconnect application program interface. Embodiments of the present invention may include collecting and converting physical access counters. Embodiments of the present invention may include collecting heat map data. Embodiments of the present invention may include calculating a tiering migration plan for an internal map change event.

20 Claims, 7 Drawing Sheets

(51) Int. Cl.
*G06F 3/06* (2006.01)
*G06F 11/30* (2006.01)

(52) U.S. Cl.
CPC .......... *G06F 3/0614* (2013.01); *G06F 3/0635* (2013.01); *G06F 3/0659* (2013.01); *G06F 11/3034* (2013.01); *G06F 11/3058* (2013.01)

(58) Field of Classification Search
CPC ... G06F 3/067; G06F 11/3034; G06F 11/3058
USPC .......................................................... 711/154
See application file for complete search history.

(56) References Cited

U.S. PATENT DOCUMENTS

| | | | |
|---|---|---|---|
| 8,930,778 B2 | 1/2015 | Cohen | |
| 8,935,493 B1* | 1/2015 | Dolan | G06F 3/0649 |
| | | | 711/161 |
| 8,972,694 B1* | 3/2015 | Dolan | G06F 3/0608 |
| | | | 711/172 |
| 9,047,017 B1* | 6/2015 | Dolan | G06F 3/061 |
| 9,448,924 B2 | 9/2016 | Sundaram | |
| 10,042,578 B2* | 8/2018 | Karve | G06F 3/0685 |
| 10,168,946 B2* | 1/2019 | Karve | G06F 3/0647 |
| 10,175,909 B2* | 1/2019 | Karve | G06F 3/0611 |
| 10,222,984 B1 | 3/2019 | O'Brien, III | |
| 10,430,084 B2 | 10/2019 | Goss | |
| 10,540,113 B2* | 1/2020 | Karve | G06F 3/0683 |
| 11,073,999 B2* | 7/2021 | Karve | G06F 3/0653 |
| 2005/0071560 A1 | 3/2005 | Bolik | |
| 2015/0006787 A1 | 1/2015 | Liu | |
| 2017/0024137 A1* | 1/2017 | Kanno | G06F 3/0644 |
| 2018/0129443 A1* | 5/2018 | Karve | G06F 3/0611 |
| 2018/0136874 A1* | 5/2018 | Karve | G06F 3/061 |
| 2018/0314459 A1* | 11/2018 | Karve | G06F 3/0611 |
| 2019/0013046 A1* | 1/2019 | Kulkarni | G06F 11/22 |
| 2019/0050163 A1* | 2/2019 | Dewey | G06F 3/0647 |
| 2019/0095125 A1* | 3/2019 | Karve | G06F 3/061 |
| 2019/0384524 A1* | 12/2019 | Karve | G06F 3/0683 |
| 2020/0301606 A1* | 9/2020 | Muthiah | G06F 3/0659 |
| 2020/0401514 A1* | 12/2020 | Liang | G06F 12/0253 |

OTHER PUBLICATIONS

Mell et al., "The NIST Definition of Cloud Computing", Recommendations of the National Institute of Standards and Technology, Special Publication 800-145, Sep. 2011, 7 pages.
International Search Report and Written Opinion of International Application No. PCT/CN2021/129429, dated Jan. 27, 2022, 10 pages.
Szczepanik et al., "Enhanced Application Performance Using Storage System Optimization," Application and Drawings filed Nov. 9, 2021, International Application No. PCT/CN2021/129429, 38 pages.

\* cited by examiner

ENHANCED APPLICATION PERFORMANCE USING STORAGE SYSTEM OPTIMIZATION

BACKGROUND

The present invention relates generally to the field of computing, and more particularly to storage systems. A multi-tiered storage approach can be used to store data on various types of storage devices based primarily on access criteria, frequency of use, security and data recovery requirements. Storage tiering may include a feature that relocates the various types of disks transparently across locations to obtain better system performance.

SUMMARY

Embodiments of the present invention disclose a method, a computer system, and a computer program product for tiering migration for storage system optimization. Embodiments of the present invention may include determining to move data based on access counters to balance a workload between storage drives and storage tiers. Embodiments of the present invention may include establishing a connection with an interconnect application program interface based on determining to move the data. Embodiments of the present invention may include collecting and converting physical access counters based on establishing the connection with the interconnect application program interface. Embodiments of the present invention may include collecting heat map data based on collecting and converting the physical access counters. Embodiments of the present invention may include calculating a tiering migration plan for an internal map change event based on collecting the heat map data.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, a multi-tiered storage approach can be used to store data on various types of storage devices based primarily on access criteria, frequency of use, security and data recovery requirements. Storage tiering may include a feature that relocates the various types of disks transparently across locations to obtain better system performance. Storage tiering was initially designed for hard disk drives (HDD) and for nearline storage disks, such as tape and hard disk drive (HDD) disk systems. The hard disk drive (HDD) and nearline storage disks use different technology than flash drives and the existing tiering mechanism for hard disk drives (HDDs) and nearline storage disks were tuned to work with flash drives for rebalancing and inter tier migration. One major limitation on the existing tiering mechanism currently is the heat measurements for flash drives and the heat measurements for hard disks are performed the same way. The heat measurements for hard disk drives (HDDs) and nearline storage disks do not operate the same as for flash drives. Therefore, it may be advantageous to, among other things, create an improvement to system resource utilization to reduce the central processing unit's (CPU's) consumption for heat map maintenance and to improve application performance using flash input-output (IO) optimization in storage systems.

The following described exemplary embodiments provide a system, a method and a program product for storage optimization. As such, embodiments of the present invention have the capacity to improve the technical field of storage optimization by optimizing flash input-output (IO) operations in storage systems to improve application performance. More specifically, enhanced application performance can be obtained during tiering migration and during an internal map change event using an updated system architecture for storage system optimization. A multi-tier architecture and an extent balancing function are created to handle the tiering migration. The tiering migration on the provided system architecture offer many advantages.

One advantage includes an improvement to the system resource utilization such that the central processing unit (CPU) consumption is reduced for heat map maintenance at the storage virtualization system. The heat map maintenance at the storage virtualization system may be used for other input-output (IO) services and purposes, thus, performance benefits occur at the system level. Additionally, application performance is enhanced and optimized by using a flash input-output (IO) optimization in a storage tiering environment by skipping heat map updates for extents that are present on the flash tier and fetching the heat map information directly from the flash translation layer (FTL) in the flash before a tiering migration decision.

Another advantage includes a collection of information from flash drives regarding the flash drive access statistics that are integrated in storage tiering. The information collected may include information regarding reducing the computing requirement at a tiering demon (i.e., tiering that runs as a background process in a computing operating system) and information that can free up memory resources that are consumed for inline heat map updates for the flash extents, which results in an improved memory optimization.

One other advantage includes an improved approach to manage the extents in the faster tier which is a space that costs are high and where performance is an important factor. Extents may include a reserved storage area in a file system. Another advantage includes an easy implementation and integration with existing storage products and no extraordinary hardware or software equipment. Another advantage includes an application performance meeting a desired performance expectation after the available resources become available by adjusting or moving the extents or the reserved storage areas. The many advantages provide significant block level and file system storage solutions for computing services and cloud-based services.

According to an embodiment, a multi-tier storage architecture is created to store data on multiple types of storage devices based on data access, data frequency of use and data security and data recovery requirement. As an example, data that is frequently accessed by an application that is response time sensitive may be stored on solid state drives (SSDs). Other data that is less frequently or infrequently accessed may be stored on high capacity 7.2K revolutions per minute (RPM) drives. The less frequently accessed data may have a higher or longer response time, however, since the data is less frequently accessed, the longer response time may be tolerable. The cost per gigabyte of storage for storing the frequently accessed data on solid state drives (SSDs) is significantly more than the cost for storing the infrequently accessed other data on the 7.2K RPM drives.

The multi-tier storage architecture may identify where to store data, for example, based on accessibility, frequency and recovery requirements. A multi-tier storage optimization program may identify data that may benefit from a higher cost and higher performance storage tier, and over time, the optimal tier may change for some data. The identifying data and the movement of data to appropriate tiers may be an ongoing process that adjusts over time based on the access of data and the frequency that the data is accessed.

Access heat temperatures may be used for virtualizing multiple types of backend disks and for autonomously moving extents across tiers. Flash storage may be situated at the higher tiers, for example, the top three tiers or the top three types of tiers, to handle the execution of hot extents. Hot extents may include data that is highly accessible by host applications. Flash drives may be capable of servicing input-output (IO) operations faster than hard disk drives (HDDs) and nearline storage disks. Therefore, flash drives may be placed at the uppermost layers of the tiering architecture. Flash drives may also cost more, thus, may contain a limited amount of space with high performance characteristics. Tiering the storage of data may move the extents based on the access heat counts that may be updated with each input-output (IO) operation.

Additionally, the hotness of the extent may be collected by an input-output (IO) monitoring demon that keeps counters for each of the extents in a tiering system. Hot extents or cold extents may be a metric that relates to back-end input-output (IO) activity. For example, a hot extent (i.e., a high activity extent) may be migrated to a higher tier and a cold extent (i.e., a low activity extent) may be demoted or migrated down to lower tiers based on the input-output (IO) activity. Monitoring the extents may be used for extent balancing. Monitoring the hot and cold extents may be done using a heat map based on heat map data. A heat map may be a metric based on workload activity for each extent. The extent demotion and keeping the extents in the flash storage may depend on the hotness of the extent. Extent demotion may include moving the extent from a faster tier to a slower tier. The demotion may typically occur when data in a faster tier is not accessed often, for example, not accessed often as per the last defined cycle, thus, moved to a slower tier. Updates to the access counter for the extent may be made when any read or write input-output (IO) request is received.

An example of a tiering model in storage controllers may include a hierarchy of storages capabilities based on cost per gigabyte with reference to performance. For example, a low cost and low performing drive may include a nearline drive. A slightly higher cost and performing drive over the nearline drive may include a high-performance enterprise drive. A higher cost and performing drive than the enterprise drive may include a high capacity flash drive. A higher cost and performing drive than the high capacity flash drive may include a high-performance flash or a solid state drive (SSD).

According to an embodiment, an extent balancing function is created to handle extent migration. The extent balancing function may handle extent migration within the same storage tier or different types of storage tiers and may be offered as a bundle solution with a tiering feature. For example, if the extent migration is between the same tier logical units (LUNs) then intra tier migration may occur for a balancing function. Also, if a disk is highly utilized and other disks on the same tier are utilized less, then some hot extents may be moved to a low utilized disk if the low utilized disk does not breach a performance limitation after the migration.

Extent balancing functions operating among different types of storage tiers or among the same types of storage tiers may improve performance as hotter extents are distributed or redistributed across multiple disks. The extent balancing functions may assist in overloading scenarios and the extent migration process improves performance by a large amount, thus, provides performance gains.

An example of tiering in an appliance stack may include network servers, switches, flash systems and varying tiers of redundant array of independent disk (RAID) storages. The appliance stack may have servers connected to storage devices that are connected over direct attachment or switched fabric within a single rack to optimize the analytical processing. For example, tier 1 may include a RAID 10 and be a write intensive enterprise software as a solution (SaaS) solid state drive (SSD) (400 GB SLC) and is the most costly. Tier 2 may include a RAID 5 and be a read intensive enterprise SAS SSD (1.6 TB MLC). Tier 3 may include a RAID 6 HDD (15K, 10K, 7.2K). Data analytics may be delivered, transmitted and used for data warehousing and analytics operations. The combination of analytics and data may be in the appliance stack and may be provided for customer use.

Example systems may use and benefit from a storage optimization program may include IBM PureData® (IBM PureData and all IBM PureData-based trademarks and logos are trademarks or registered trademarks of International Business Machines Corporation and/or its affiliates), Netezza® IBM® (Netezza and all Netezza-based trademarks and logos are trademarks or registered trademarks of International Business Machines Corporation and/or its affiliates), and many other storage units. IBM PureData® is a system for analytics that uses Netezza® technology to deliver a mechanism for data warehousing and analytics operations on data. The systems allow for storage management of application data and an internal use of storage tiering at the cluster level to obtain optimal performance across drives.

Extents that are occupied as flash space in flash drives may require rebalancing to move data across flash drives based on access heat counts. Target disks and overload identification in flash drives may be dependent on the access counters that are maintained at a virtualization level such that arrays may keep the access statistics at the virtualization level and extent movement based on the collected data may be performed.

Since extent balancing is limited in existing tiering solutions, heat measurements and migration for flash drives, a current typical scenario may now be discussed. Solid state drive (SSD) flash controllers or storage virtualization controllers in a flash drive contain a flash translation layer (FTL) that manages solid state drive (SSD) operations and that monitors input-output (IO) operations performed on the flash drive logical block addressing (LBA). A flash transition layer (FTL) module may fetch for the input-output (IO) operations and may maintain a table of input-output (IO) counters and logical block addressing (LBA) location blocks of the drive. The table of data obtained by the flash transition layer (FTL) module may be used to calculate drive writes per day (DWPD), wear leveling predictions and application data.

Storage virtualization controllers may also keep the input-output (IO) counters based on extents (e.g., extents mapped to logical block addressing (LBA) units) and may be used for tiering movements across tiers. The input-output (IO) counter updates may be performed on each input-output (IO) operation transmitted to a storage system. When an extent is present in a faster performing tier, the storage system may expect more input-output (IO) requests to associated extents. Each input-output (IO) operation may be counted at two locations of the flash drive and the double counting may create an inefficiency in the overall system architecture when delivering highly accessible data in the system. The double counting at two locations may include one count at the storage tiering level and another count at the flash transition layer (FTL) level. The input-output (IO) counters are updated based on the drive level mappings of physical locations and are updated to monitor wear leveling and other flash functions at the access counter at the flash transition layer (FTL) in the flash drive.

Many complexities are associated with obtaining retained data from access counters on a flash drive and using the data to distill information from a flash control unit to a storage virtualization system. One complexity includes mapping the physical logical block addressing (LBA) to virtualized logical block addresses (LBAs) as the mapping changes at the drive level and the drive level is unaware of the upper layers of the storage virtualization engine. During a change in mapping, the counters are vanished and restarted for new physical locations. Another complexity includes the input-output (IO) statistics at the storage system level are counted based on the extents and there may not be extent visibility to the drive firmware as the firmware works at the logical physical logical block addressing (LBA) level. Embodiments presented herein increase input-output (IO) performance (i.e., faster performing flash tier), reduce input-output latency and increase operation efficiency.

Figure 1:
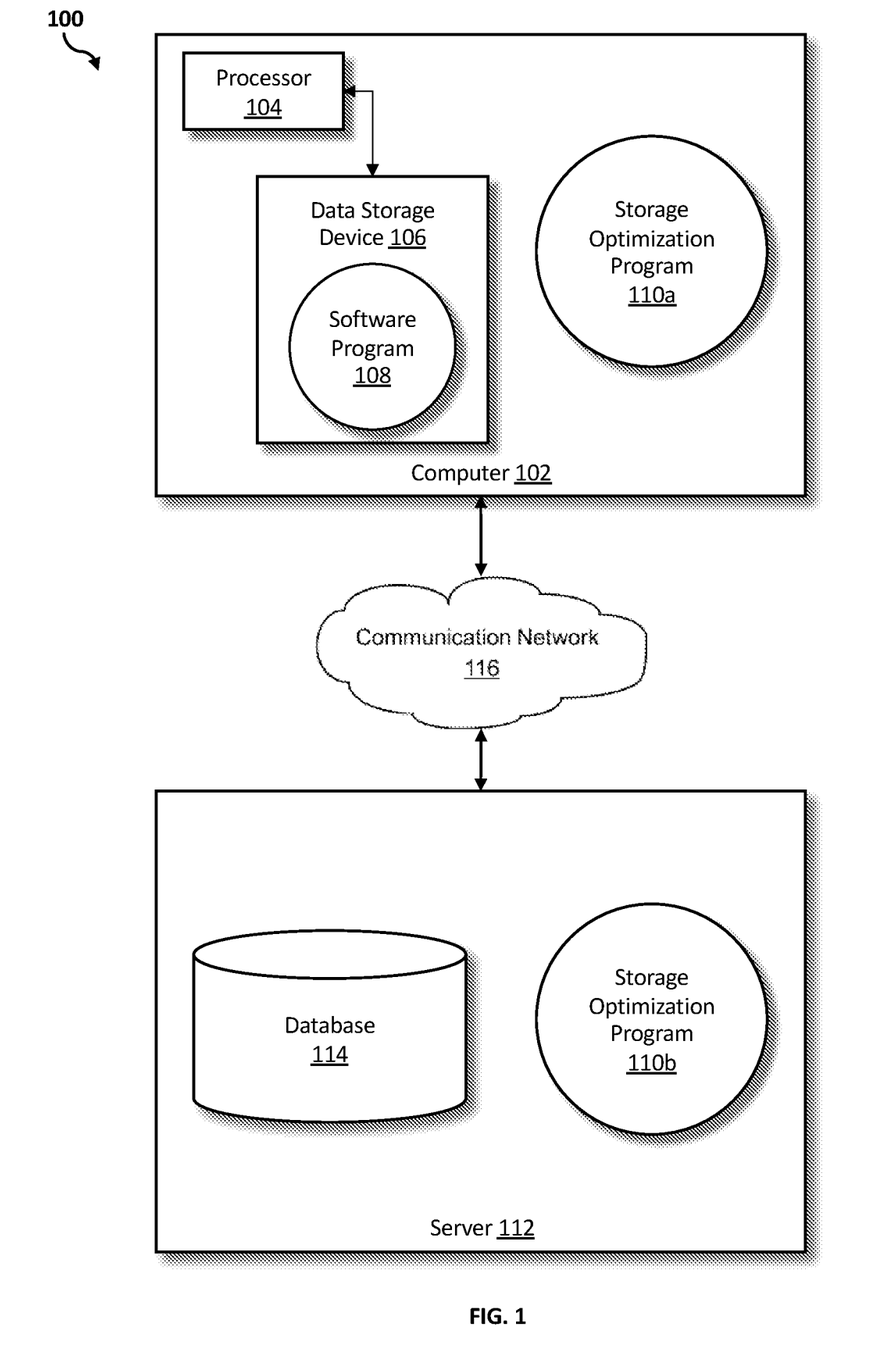
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that are enabled to run a software program 108 and a storage optimization program 110a. The networked computer environment 100 may also include a server 112 that is enabled to run a storage optimization program 110b that may interact with a database 114 and a communication network 116. The computer 102 may also be known as a client computer and the server 112 may also be known as a server computer. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The computer 102 may communicate with the server 112 via the communications network 116. The communications network 116 may include connections, such as wire, wireless communication links, or fiber optic cables. As will be discussed with reference to FIG. 5, server 112 may include internal components 902a and external components 904a, respectively, and computer 102 may include internal components 902b and external components 904b, respectively. The server 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the storage optimization program 110a, 110b may interact with a database 114 that may be embedded in various storage devices, such as, but not limited to a computer/mobile device 102, a server 112, or a cloud storage service.

According to the present embodiment, a user operating a computer 102 or a server 112 (e.g., a server computer) may use the storage optimization program 110a, 110b (respectively) to enhance application performance using storage system optimization. The storage optimization method is explained in more detail below with respect to FIGS. 2-4.

Figure 2:
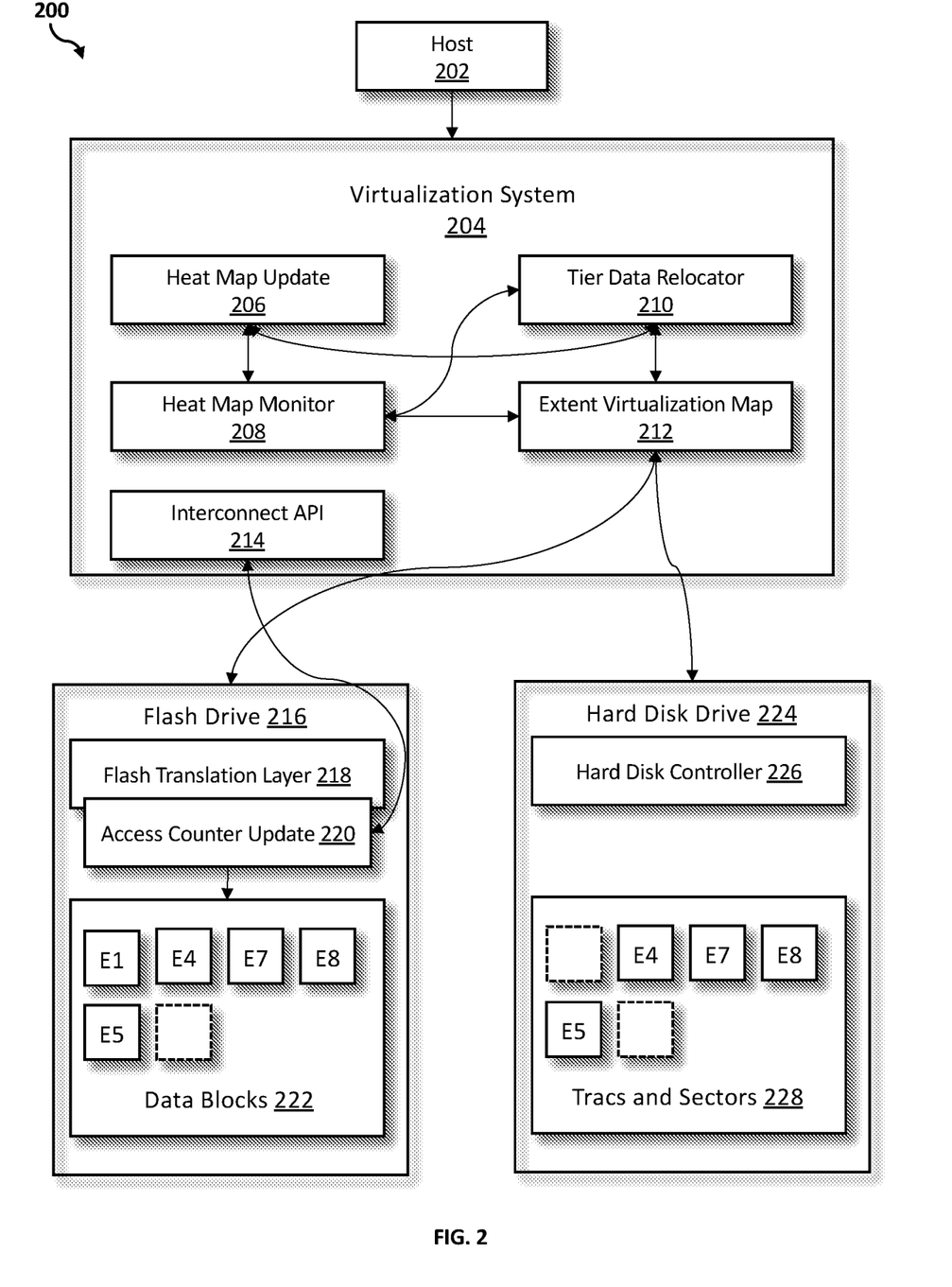
FIG. 2 is a block diagram example of the system architecture for storage system optimization according to at least one embodiment.

Referring now to FIG. 2, a block diagram example of the system architecture for storage system optimization 200 used by the storage optimization program 110a, 110b according to at least one embodiment is depicted. The system architecture for system storage optimization 200 may work with existing storage tier features, may collect information from virtualization maps for available tiers in the storage pools and may enable an optimized input-output (IO) statistic gathering for flash drives in the system.

The storage optimization program 110a, 110b may communicate with the system architecture for system storage optimization 200. Within the system architecture for the storage system optimization 200, a host 202 may include a computer or server connected to a network of services and the host 202 may transmit information to the virtualization system 204. The virtualization system may receive or obtain data from a host 202 and may contain a heat map update 206 module or component, a heat map monitor 208, a tier data relocator 210 module or component, an extent virtualization map 212 and an interconnect application program interface (API) 214 module for component.

The heat map update 206 module may process and maintain the input-output (IO) counter for each extent in a storage pool. The heat map update 206 may also maintain the access counters when any input-output (IO) reaches or is transmitted to the system. The heat map monitor 208 may process the monitor workload on the extent for the purpose of performing load balancing and additional tiering migration processes for performance improvements. The tier data relocator 210 module may keep track of which extents are located at what tier and may track the workload to make the extents available on the same tier based on workload. The tier data relocator 210 may be used to select the promotion or demotion cases or which extents may be promoted or demoted.

The extent virtualization map 212 may contain the extents and the target drive where the data is physically located. The extent virtualization map 212 may be used to obtain information relating to local or physical mapping of the data in the storage system. The interconnect application program interfaces (API) 214 may allow external entities to perform internal operations with authentication such that the internal parameters settings may be controlled externally.

The flash drive 216 may include a flash translation layer (FTL) 218, an access counter update 220 module and data blocks 222. The flash transition layer (FTL) 218 in the flash solid state drive (SSD) disk controllers may fetch the access map of the logical block addressing (LBA) (e.g., data blocks 222) from the flash transition layer (FTL) 218 before a tiering migration decision. The hard disk drive (HDD) 224 may include a hard disk controller 226 and tracs and sector addresses 228. Tracs and sector addresses 228 may be a hardware location address in a hard disk drive (HDD) where the data is saved.

A data collection demon in an existing tiering feature may be tuned to get the information directly from the flash transition layer (FTL) 218 for the logical block addresses (LBAs) (e.g., data blocks 222) that correspond to the flash drive 216. For example, a feature support map in a tiering function may be represented in Table 1.

TABLE 1

Feature Support Map

| Drive ID | Tier Level | Offload Supported |
|---|---|---|
| 1 | Flash | Yes (contains FTL heat management capability) |
| 2 | Flash | No |
| 3 | HDD | N/A |

Once the flash logical block addresses (LBAs) are collected at the flash transition layer (FTL) 218, the information may be translated to the extent maps at the extent virtualization map 212 module by traversing the virtualization map maintained at the storage level. For example, a logical block address (LBA) to extent map may be shown in Table 2 for the virtualization layer (e.g., virtualization system 204).

TABLE 2

Logical Block Address (LBA) to Extent Map

| Logical LBA | Extent ID |
|---|---|
| 0x0000001234 | 1 |
| 0x0000001235 | 1 |
| 0x0000001247 | 2 |

An extent heat map example may be shown in Table 3 in the storage tiering.

TABLE 3

Extent Heat Map

| Extent ID | Heat |
|---|---|
| 1 | 1025 |
| 2 | 2901 |
| 3 | 522 |

The input-output statistics that are collected may be updated for the respective flash extents that contribute to the tiering. The changing of the logical block addresses (LBAs) may be managed at the flash transition layer (FTL) 218 level by proactively signaling the upper layer or level storage system (e.g., virtualization system 204) using a messaged based communication to the upper layer storage system for collecting the data before the data is lost due to internal movement. The application program interface (API) 214 may communicate between the storage system (e.g., virtualization system 204) and the drive flash transition layer (FTL) 218 as opposed to a method of garbage collection running as a background process that update access counter maps.

The communication protocol created by the storage optimization program 110a, 110b may include a data dumping signal to the tiering data collection demon. The data dumping signal may include a special communication message between entities for the purpose of exchanging information. In response to the data collection demon, the data structures (e.g., data blocks 222) may be allocated and saved and the extent level heat map may be updated for the solid state drive (e.g., flash drive 216) extent. The storage optimization program 110a, 110b retains correct access counters for the respective logical block address (LBA) locations by maintaining an identification of the flash's internal operations (e.g., garbage collection) to the storage tiering. Access counters may be maintained at a tiering level and physical access counters may be maintained at the drive level (e.g., access counter for logical block address (LBA) locations). As an example, access counters are used to determine if a tiering migration should be done or to trigger the tiering migration. Physical access counters may be used for drive level grooming, such as garbage collection and internal paging of the solid state drive (SSD).

Some modern flash drives may offer internal input-output (IO) monitoring capabilities that can be utilized and leveraged with application program interfaces (APIs). The storage tiering data collector demon in the storage optimization program 110a, 110b may distinguish between supported flash and other non-flash storage locations for the extents in the pools. This distinguishing feature, the storage tiering data collector demon, may activate for only flash situated extents since the storage optimization program 110a, 110b can distinguish between flash and non-flash storage locations.

The communication transmission between the storage tiering demon and the flash translation layer (FTL) 218 may be performed using an in-bound and out-of-bound protocol. An inbound implementation may use protocols, such as a small computer system interface (SCSI) command descriptor block (CDB) or a non-volatile memory express (NVMe™) (NVMe and all NVMe-based trademarks and logos are trademarks or registered trademarks of NVM Express, Inc. and/or its affiliates) data descriptors. An out-of-bound protocol may use an enteral host or computing entity to transmit communication between the elements, such as between the initiator and the target device.

When an external storage (e.g., flash drive 216 or hard disk drive (HDD) 224) is virtualized by a storage virtualization engine (e.g., virtualization system 204), the storage optimization program 110a, 110b may identify, use and transmit the drive's (e.g., flash drive's 216) flash translation layer (FTL) 218 information to the frontend storage cluster (e.g., storage system or virtualization system 204). The information obtained may be consumed by the tiering feature (e.g., tier data relocator 210) to optimize the heat count measurement of the overall system (e.g., virtualization system 204). This step may remove an unnecessary step in input-output (IO) processing such that central processing unit (CPU) consumption is reduced. Additionally, since a majority of input-output (IO) operations are served from a faster performing tier, a significant improvement to the efficiency of input-output (IO) performance is obtained for faster tiers. For example, the amount of a read workload is more computationally intensive in data analytics applications than write workloads on a storage system, thus, less changes may be made of intermediate heat updates that are required due to logical block addressing (LBA) mapping changes in the flash translation layer (FTL) 218 (i.e., more performance gain).

For example, the host 202 is reading data from a storage system (e.g., virtualization system 204), such as 1,10,000. The total read data accessed by the host 202 is 1,00,000 input-output (IO) operations and are performed on a flash tier between two tiering cycles in the past 24 hours in an easy tier with the more accessible blocks located on one or more flash drives (e.g., flash drive 216). Once the input-output (IO) reaches the storage system (e.g., virtualization system 204), the heat map update 206 is updated for the extents. Thus, 1,00,000 heatmap updates are done at the heat map manager (e.g., heat map monitor 208) in tiering. As a result, 1,00,000 input-output (IO) counter updates occur at the flash transition layer (FTL) 218 used to compute the drive writes per day (DWPD), used to read disturbance monitoring and used for other health checkups for the drive.

Continuing with the same example, in total, 2,00,000+ 10,000=2,10,000 operations are counted for in an access history management which is approximately 2+ operations per input-output (IO). In order to solve this existing limitation, the access counter update 220 and the heat map update 206 modules for 10,000 input-output (IO) operations of non-flash locations may be performed at the storage tiering level (e.g., heat map update 206).

For all flash input-output (IO) operations, the heat map update module 206 for the tiering monitor is skipped. The information may be collected by querying the drive flash transition layer (FTL) 218 before making a tiering decision. Thus, 1,00,000+10,000=1,10,000 operations are required to maintain heat statistics. With the clear number of operations required to keep or maintain the heat map allows for resource optimization.

Figure 3:
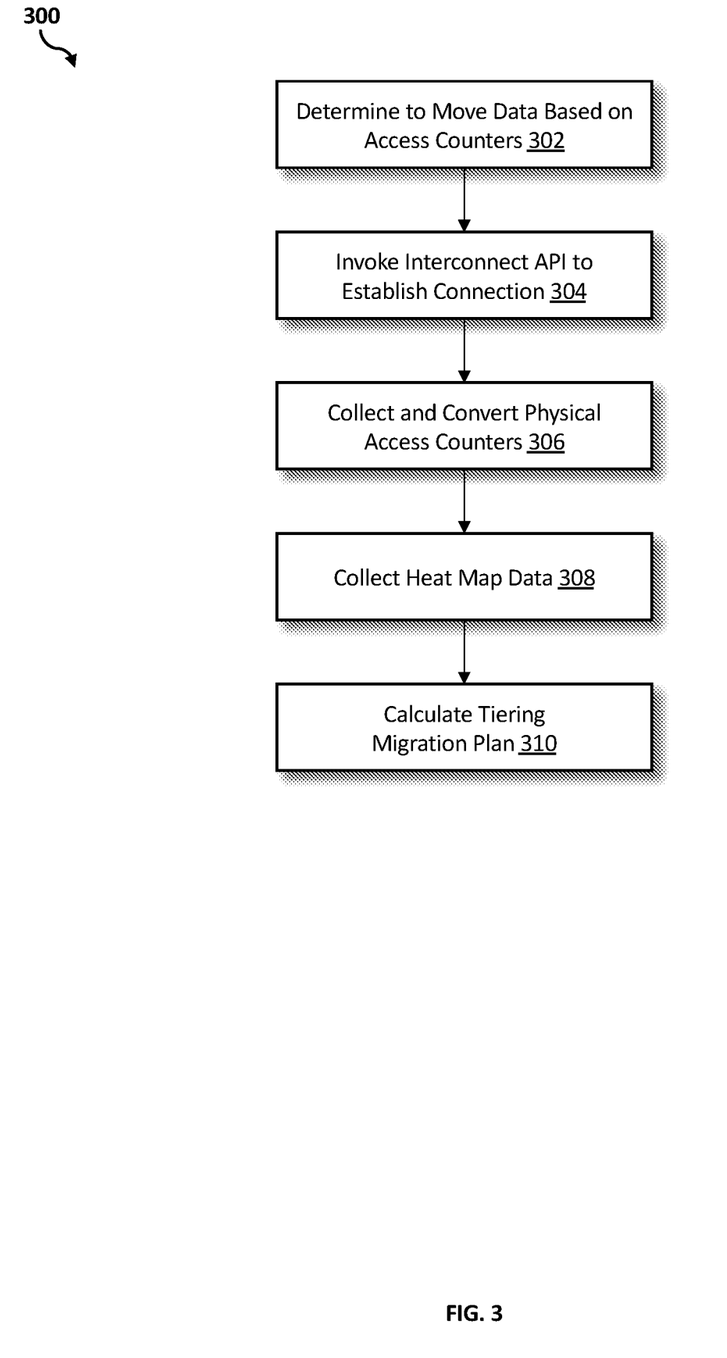
FIG. 3 is an operational flowchart illustrating a process for enhanced application performance during tiering migration using storage system optimization according to at least one embodiment.

Referring now to FIG. 3, an operational flowchart illustrating the exemplary enhanced application performance during tiering migration process 300 used by the storage optimization program 110a, 110b according to at least one embodiment is depicted. The storage optimization program 110a, 110b may be leveraged to optimize flash input-output (IO) operations in storage systems during tiering migration by using the system architecture for system storage optimization 200. This updated system architecture is a multi-tiered architecture that is utilized to balance extent functions and to process tiering migration to achieve a balance in workload between the storage drives and the storage tiers.

At 302, determining to move data based on the access counters. The tier data relocator 210 may determine to move the data based on the access counters. The determination is made based on the input-output (IO) workload on the extents in the last tiering cycle. The determination to move data based on the access counters is made in order to balance the workload between the drives and the tiers. The input-output (IO) workload may include a drive threshold-based migration for workloads. For example, a tiering demon keeps the static threshold and makes the migration decision if the extent is not staying within the limits of the current drive where the extent is located.

At 304, an interconnect API 214 is invoked to establish a connection. The interconnect APIs are invoked, and the interconnect APIs establish a connection with the backend drive subsystem, such as the backend solid state drives (SSDs). The storage optimization program 110a, 110b may request the interconnect APIs to transmit the data collection based on the determination to move the data based on the access counters.

At 306, physical access counters are collected and converted. A collection of the drive's access counters may be collected for tiering migration. The physical access counters may be collected and converted to virtual logical block addresses (LBAs) in the flash drive 216 data blocks 222. The flash drive 216 may be considered hot data and the data blocks 222 may hold physical addresses. The access table containing the virtual addresses and the heat data may be transferred or transmitted to the storage system (e.g., virtualization system 204)

At 308, heat map data is collected. The heat map data may be collected at the heat map update 206 module. The heat map update 206 module may contain the heat map for each input-output (IO) operation. The collected heat map data from the drive (e.g., flash drive 216) may be parsed to obtain the extent level mapping. The data structures may be provisioned, and the heat maps may be updated at the heat map update 206 module for the respective extents.

At 310, a tiering migration plan is calculated. The tier data relocator 210 may calculate the tiering migration plan and move the extents identified at the extent level mapping at step 308 to respective storage tiers. The calculations of the tiering migration plan may, for example, be calculated using a tiering manager. The tiering manager may keep the minimum and maximum threshold values for each supported drive type in a storage pool. When a new input-output (IO) is transmitted to the storage or is received by the storage, the tiering manager keeps track of the workload. At the time of the tiering cycle, the counters may be matched with the reference counters to either keep or move the extent from the current drive. For example, if the extent receives a significant amount of reduced input-outputs (IOs) on the last tiering cycle, then this matching suggests to demote the extent as the significantly less amount of input-outputs (IOs) are received, which may be lower and then keeps the threshold value.

Figure 4:
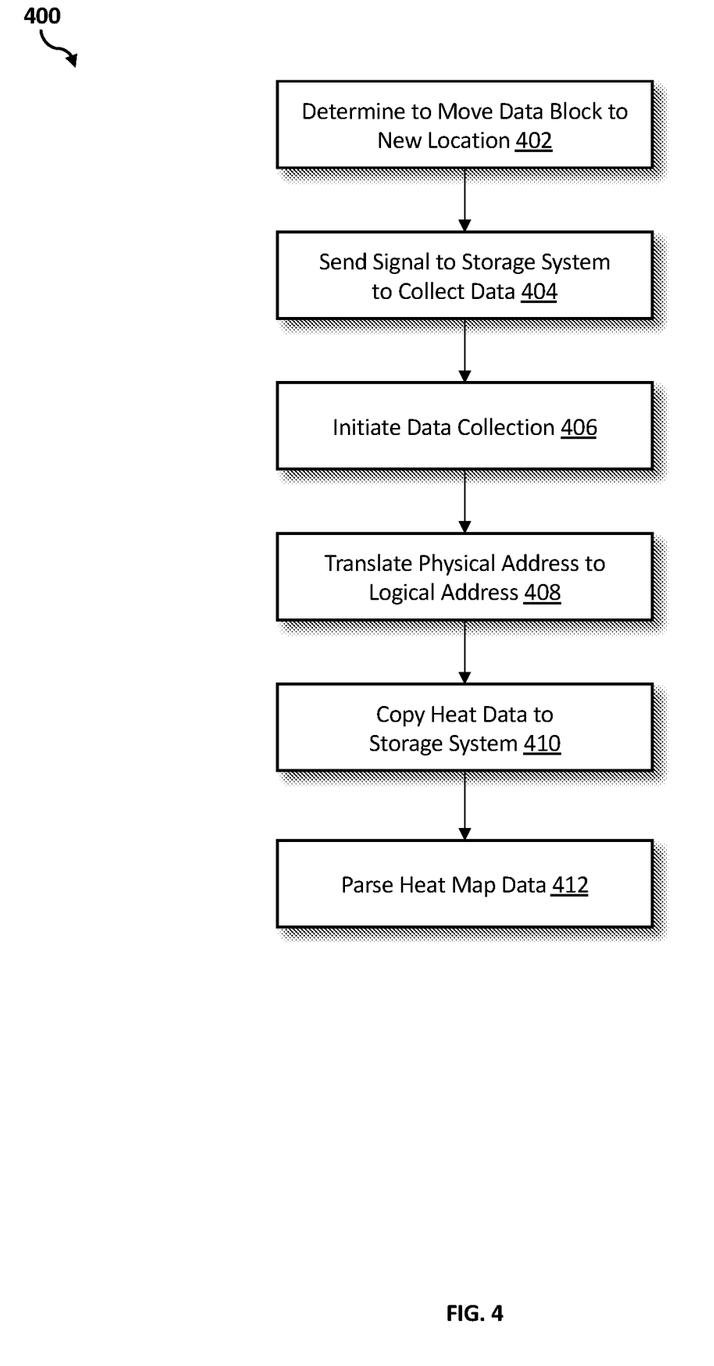
FIG. 4 is an operational flowchart illustrating a process for enhanced application performance during an internal map change event using storage system optimization according to at least one embodiment.

Referring now to FIG. 4, an operational flowchart illustrating the exemplary enhanced application performance during an internal map change event process 400 used by the storage optimization program 110a, 110b according to at least one embodiment is depicted.

At 402, determining to move a data block to a new location. The flash transition layer 218 in the flash drive 216 may detect that one or more data blocks 222 need to move to a new location. The determination to move the data block may include identifying the heat value at the current location and moving the data block. The heat values may be defined by the storage system as a static file. The values may be assigned based on the supported drive types and the drive input-output (IO) serving capability. For example, IBM® Easy Tier® (IBM Easy Tier and all IBM Easy Tier-based trademarks and logos are trademarks or registered trademarks of International Business Machines Corporation and/or its affiliates) may store a spreadsheet or xml file where the reference values are hardcoded or stored with fixed parameters.

At 404, a signal is sent to the storage system to collect data. The signal is transmitted to the storage system (e.g., virtualization system 204) based on the determination to move a data block to a new location. The flash transition layer 218 may transmit a signal to the storage system (e.g., virtualization system 204) to collect data from the access heat counters before the internal logical block address (LBA) movement begins.

At 406, data collection is initiated. The data collection is initiated based on the signal transmitted to collect data from the access heat counters. The data collection may be initiated by the interconnect API 214. The interconnect API 214 may receive a signal from the drives (e.g., flash drive 216) and initiate the data collection.

At 408, a physical address is translated to a logical address. In response to the data collection initiated, the flash translation layer 218 may translate the physical addresses to logical block addresses (LBAs) and then transmit the tuple to the storage system. The tuple may contain the logical block address (LBA) and the heat count. An example of a logical to physical address translation map inside the flash translation layer 218 may be provide in Table 4.

TABLE 4

| Translation Map | | |
| --- | --- | --- |
| Logical LBA | Physical LBA | Heat |
| 0x0000001234 | 0x000F0E7310 | 60 |
| 0x0000001235 | 0x000F0E73C4 | 103 |
| 0x0000001247 | 0x000F0E73A9 | 1029 |
| 0x000000129F | 0x000F0E7AC2 | 73 |

At 410, heat data is copied to the storage system. The flash translation layer 218 may copy the heat data to the storage system. Once the heat data or heat information is copied to a storage system, the block movement operations are allowed to process.

At 412, the heat map data is parsed. The heat map update 206 may parse the collected heat map from the drive and may parse the heat map to obtain the extent level mapping. The data structures may be provisioned, and the heat maps may be updated for the respective extents.

It may be appreciated that FIGS. 2-4 provide only an illustration of one embodiment and do not imply any limitations with regard to how different embodiments may be implemented. Many modifications to the depicted embodiment(s) may be made based on design and implementation requirements.

Figure 5:
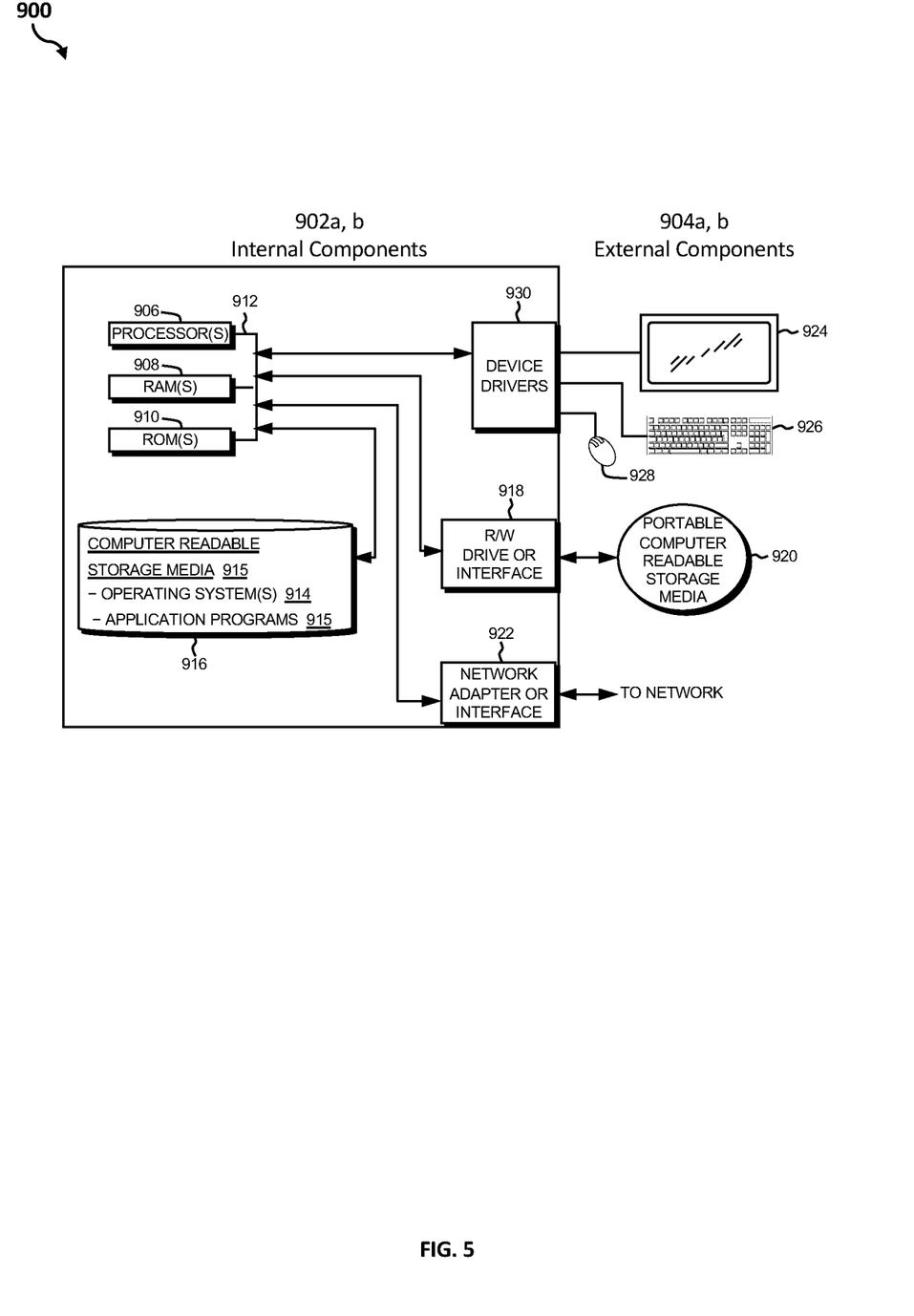
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computer 102 and server 112 may include respective sets of internal components 902a, b and external components 904a, b illustrated in FIG. 5. Each of the sets of internal components 902a, b includes one or more processors 906, one or more computer-readable RAMs 908 and one or more computer-readable ROMs 910 on one or more buses 912, and one or more operating systems 914, with one or more application programs 915 and one or more computer readable storage media 915. The one or more operating systems 914, the software program 108, and the outage restoration prediction program 110a in client computer 102, and the outage restoration prediction program 110b in network server 112, may be stored on one or more computer readable storage media 915 for execution by one or more processors 906 via one or more RAMs 908 (which typically include cache memory). In the embodiment illustrated in FIG. 5, each of the computer readable storage media 915 is a magnetic disk storage device of an internal hard drive. Alternatively, each of the computer readable storage media 915 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the storage optimization program 110a, 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G/4G/5G wireless interface cards or other wired or wireless communication links. The software program 108 and the storage optimization program 110a in the computer 102 and the storage optimization program 110b in a network server 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the storage optimization program 110a in computer 102 and the storage optimization program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
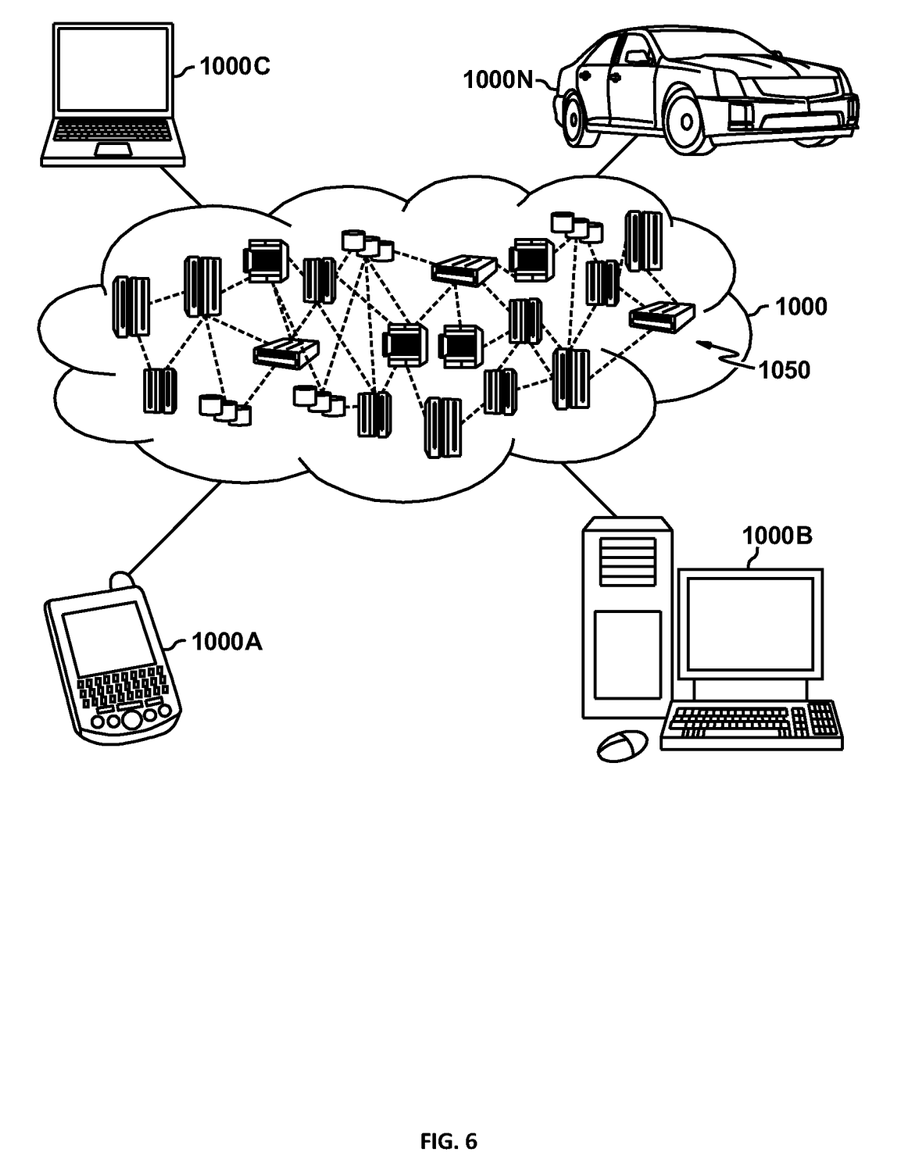
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, the cloud computing environment 1000 includes one or more cloud computing nodes 1050 with which local computing devices used by cloud consumers, such as, for example, personal digital assistant (PDA) or cellular telephone 1000A, desktop computer 1000B, laptop computer 1000C, and/or automobile computer system 1000N may communicate. Cloud computing nodes 1050 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 1050 and cloud computing environment 1000 can communicate with any type of computerized device over any type of network and/or network addressable connection (e.g., using a web browser).

Figure 7:
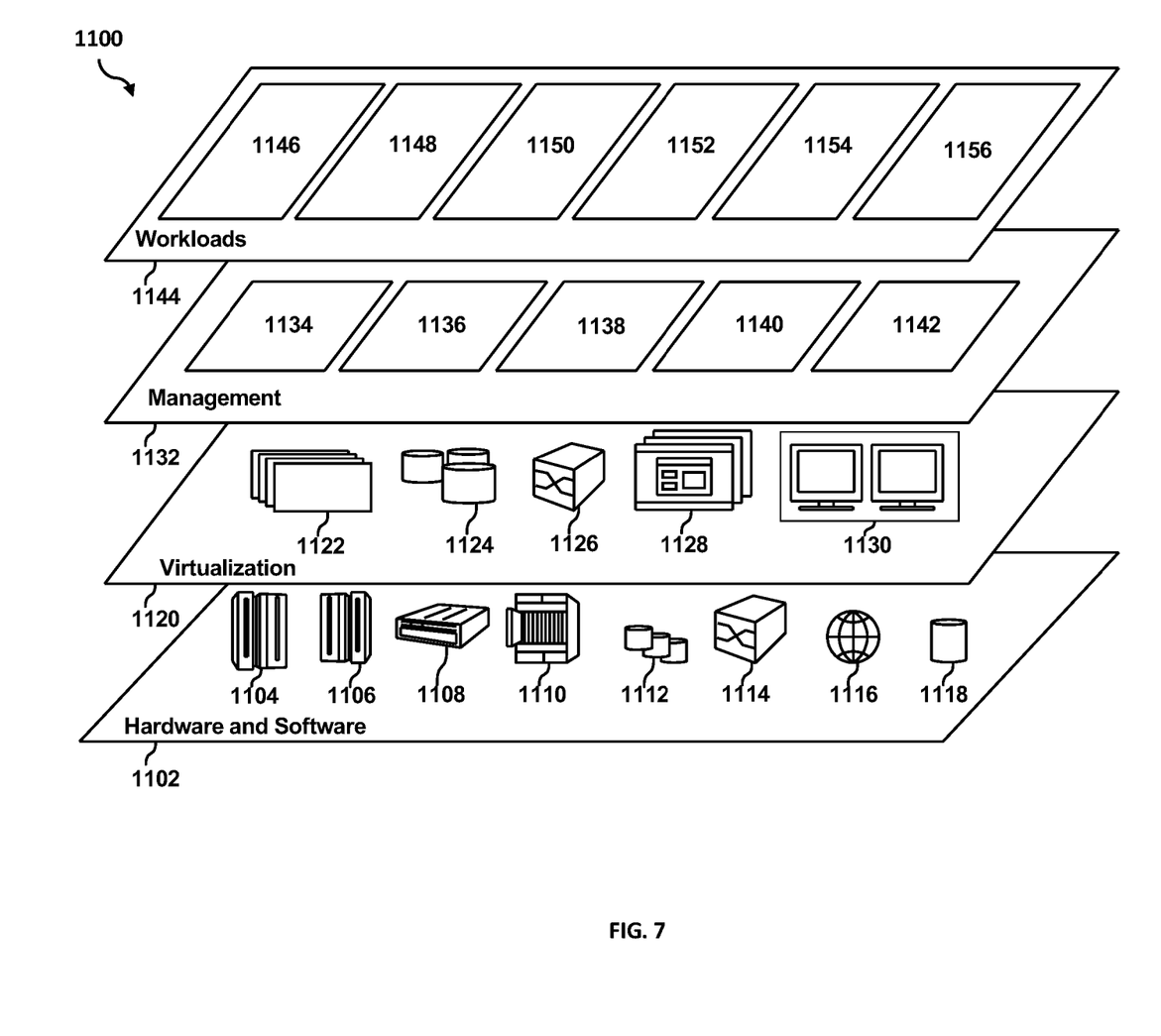
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

A hardware and software layer 1102 include hardware and software components. Examples of the hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, a management layer 1132 may provide the functions described below. Resource provisioning 1134 provides dynamic procurement of computing resources and other resources that are utilized to perform tasks within the cloud computing environment. Metering and pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions that may be provided from this layer include: mapping and navigation 1146; software development and lifecycle management 1148; virtual classroom education delivery 1150; data analytics processing 1152; transaction processing 1154; and storage optimization 1156. A storage optimization program 110a, 110b provides a way to enhanced application performance during tiering migration and during an internal map change event using storage system optimization.

The present invention may be a system, a method, and/or a computer program product at any possible technical detail level of integration. The computer program product may include a computer readable storage media 915 (or media) having computer readable program instructions thereon for causing a processor 906 to carry out aspects of the present invention.

The computer readable storage media 915 can be a tangible device that can retain and store instructions for use by an instruction execution device. The computer readable storage media 915 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage media 915 includes the following: a portable computer diskette, a hard disk, a random access memory (RAM) 908, a read-only memory (ROM) 910, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage media 915, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage media 915 or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface 922 in each computing/processing device receives computer readable program instructions from the network and forwards the computer readable program instructions for storage in a computer readable storage media 915 within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor 906 of a general purpose computer, special purpose computer, or other programmable data processing apparatus to produce a machine, such that the instructions, which execute via the processor 906 of the computer or other programmable data processing apparatus, create means for implementing the functions/acts specified in the flowchart and/or block diagram block or blocks. These computer readable program instructions may also be stored in a computer readable storage media 915 that can direct a computer, a programmable data processing apparatus, and/or other devices to function in a particular manner, such that the computer readable storage media 915 having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for tiering migration for storage system optimization, the method comprising:
    determining to move data based on access counters to balance a workload between storage drives and storage tiers;
    establishing a connection with an interconnect application program interface based on determining to move the data;
    collecting and converting physical access counters based on establishing the connection with the interconnect application program interface;
    collecting heat map data at a flash translation layer based on collecting and converting the physical access counters;
    collecting extent virtualization map data;
    predicting a wear level based on collecting the heat map data; and
    calculating a tiering migration plan for an internal map change event based on collecting the heat map data and further based on collecting the extent virtualization map data.

2. The method of claim 1, further comprising:
    determining to move a data block to a new location;
    transmitting a signal to a storage system to collect data from access heat counters;
    initiating the collection of the data from the access heat counters;
    translating a physical address to a logical address;
    copying the heat map data to the storage system; and
    parsing the heat map data.

3. The method of claim 1, wherein determining to move the data is made based on an input-output workload on extents in a last tiering cycle.

4. The method of claim 1, wherein the physical access counters are converted to virtual logical block addresses.

5. The method of claim 1, wherein the heat map data contains a heat map for each input-output operation.

6. The method of claim 1, wherein the tiering migration plan includes moving extents identified at an extent level mapping to storage tiers.

7. The method of claim 2, wherein the heat map data is parsed to obtain an extent level mapping.

8. A computer system for tiering migration for storage system optimization, comprising:
    one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
  determining to move data based on access counters to balance a workload between storage drives and storage tiers;
  establishing a connection with an interconnect application program interface based on determining to move the data;
  collecting and converting physical access counters based on establishing the connection with the interconnect application program interface;
  collecting heat map data at a flash translation layer based on collecting and converting the physical access counters;
  collecting extent virtualization map data;
  predicting a wear level based on collecting the heat map data; and
  calculating a tiering migration plan for an internal map change event based on collecting the heat map data and further based on collecting the extent virtualization map data.

9. The computer system of claim 8, further comprising:
  determining to move a data block to a new location;
  transmitting a signal to a storage system to collect data from access heat counters;
  initiating the collection of the data from the access heat counters;
  translating a physical address to a logical address;
  copying the heat map data to the storage system; and
  parsing the heat map data.

10. The computer system of claim 8, wherein determining to move the data is made based on an input-output workload on extents in a last tiering cycle.

11. The computer system of claim 8, wherein the physical access counters are converted to virtual logical block addresses.

12. The computer system of claim 8, wherein the heat map data contains a heat map for each input-output operation.

13. The computer system of claim 8, wherein the tiering migration plan includes moving extents identified at an extent level mapping to storage tiers.

14. The computer system of claim 9, wherein the heat map data is parsed to obtain an extent level mapping.

15. A computer program product for tiering migration for storage system optimization, comprising:
  one or more computer-readable tangible storage media and program instructions stored on at least one of the one or more computer-readable tangible storage media, the program instructions executable by a processor to cause the processor to perform a method comprising:
    determining to move data based on access counters to balance a workload between storage drives and storage tiers;
    determining to move data based on access counters to balance a workload between storage drives and storage tiers;
    determining to move data based on access counters to balance a workload between storage drives and storage tiers;
    establishing a connection with an interconnect application program interface based on determining to move the data;
    collecting and converting physical access counters based on establishing the connection with the interconnect application program interface;
    collecting heat map data at a flash translation layer based on collecting and converting the physical access counters;
    collecting extent virtualization map data;
    predicting a wear level based on collecting the heat map data; and
    calculating a tiering migration plan for an internal map change event based on collecting the heat map data and further based on collecting the extent virtualization map data.

16. The computer program product of claim 15, further comprising:
  determining to move a data block to a new location;
  transmitting a signal to a storage system to collect data from access heat counters;
  initiating the collection of the data from the access heat counters;
  translating a physical address to a logical address;
  copying the heat map data to the storage system; and
  parsing the heat map data.

17. The computer program product of claim 15, wherein determining to move the data is made based on an input-output workload on extents in a last tiering cycle.

18. The computer program product of claim 15, wherein the physical access counters are converted to virtual logical block addresses.

19. The computer program product of claim 15, wherein the heat map data contains a heat map for each input-output operation.

20. The computer program product of claim 15, wherein the tiering migration plan includes moving extents identified at an extent level mapping to storage tiers.

* * * * *